US007066404B1

(12) United States Patent
Kollar

(10) Patent No.: US 7,066,404 B1

(45) Date of Patent: Jun. 27, 2006

(54) SPRINKLER SPRAY SHIELD

(76) Inventor: Fredrick Phillip Kollar, 38 Oxbow Creek La., Laguna Hills, CA (US) 92653

( * ) Notice: Subject to any disclaimer, the term of this patent is extended or adjusted under 35 U.S.C. 154(b) by 216 days.

(21) Appl. No.: 10/603,267

(22) Filed: Jun. 23, 2003

(51) Int. Cl.
*B05B 1/28* (2006.01)
*A01G 25/06* (2006.01)

(52) U.S. Cl. .................. 239/288; 239/288.5; 239/201; 239/505; 239/518; 239/521

(58) Field of Classification Search ................ 239/288, 239/288.3, 288.5, 499, 505, 509, 521, 518, 239/223, 224, 275, 231, 201, 202
See application file for complete search history.

(56) References Cited

U.S. PATENT DOCUMENTS

| | | | | |
|---|---|---|---|---|
| 270,664 | A * | 1/1883 | Henderson | 239/231 |
| 1,228,658 | A * | 6/1917 | Gaines | 239/275 |
| 1,364,163 | A * | 1/1921 | Wampler | 239/516 |
| 1,840,721 | A * | 1/1932 | Ingram | 239/222.17 |
| 2,065,549 | A * | 12/1936 | Balensiefer | 239/275 |
| 2,639,191 | A | 5/1953 | Hruby, Jr. | |
| 3,009,652 | A | 11/1961 | McKay | |
| 4,461,423 | A | 7/1984 | Davis | |
| D312,296 | S | 11/1990 | Smallwood | |
| 5,039,015 | A | 8/1991 | De La Vega, Jr. | |
| D418,577 | S | 1/2000 | Davis | |
| 6,336,599 | B1 | 1/2002 | Herr | |
| 6,575,380 | B1 * | 6/2003 | Corbett | 239/1 |

OTHER PUBLICATIONS

Orbit Underground Sprinklers—Bountiful, Utah 84010 Orbit Layout Guide (Rev. 3-93).

* cited by examiner

*Primary Examiner*—David A. Scherbel
*Assistant Examiner*—Seth Barney

(57) ABSTRACT

A spray shield apparatus for shielding against spray from a sprinkler head and which can be quickly and easily attached and detached from a sprinkler standpipe or riser. The spray shield apparatus (20) has a semi-cylindrical body (22) enclosed within a circular segmental top end (21) and a circular segmental bottom end (24) and that attaches to a riser (29) via a snap-in attaching hole (26) integrated within said circular segmental bottom end. Configured into said snap-in attaching hole is a gripping aperture (27) that engages said riser via friction fit and affixes said spray shield in position. Additionally, an orienting shelf (25) on the interior of said semi-cylindrical body serves to prevent the spray shield apparatus from being nudged forward and interfering with a spray pattern.

5 Claims, 4 Drawing Sheets

SPRINKLER SPRAY SHIELD

CROSS REFERENCE TO RELATED APPLICATIONS

Not Applicable.

FEDERALLY SPONSORED RESEARCH

Not Applicable.

SEQUENCE LISTING OR PROGRAM

Not Applicable.

BACKROUND OF THE INVENTION

1. Field of Invention

This invention relates to the field of commercial and residential irrigation and more specifically to an improved device that will deflect spray emitted from a sprinkler.

2. Backround

Sprinkler systems are commonly used to irrigate planted areas of land in business and residential tracts. A popular form of these sprinkler systems uses standpipes or risers, which emanate vertically from a network of water supply pipes that are permanently placed underground or located on the ground surface. Risers commonly used in residential or commercial gardens are of varying heights from 1½ inches to 36 inches and are threaded in male fashion on both ends which allows the connection of the riser to the supply line and the attachment of a sprinkler head atop the riser. Generally, risers and the attached sprinkler heads are the exposed components of these networks of water pipes, and are spaced to effectively reach the entirety of specific areas that may include planted, irrigation-dependent components such as shrubbery, ground covers, flowers or grass.

A very common form of contemporary sprinkler head design is termed a shrub head or a pattern spray head. These sprinkler heads are popular for their economy, ease of use and the fact that they allow the user to select from specific spray patterns such as full circle, semi-circle, quarter circle etc., depending on the area of desired coverage. Semi and quarter circle patterns are most commonly used in confined areas of shrubbery, ground cover or flowers that are adjacent to moisture sensitive areas such walkways, buildings or structures. The intent is to limit the spray pattern to the desired area and away from areas where exposure to irrigation water could result in unsafe footing or structural damage. When the spray head is in proper alignment spray should not fire outside of the intended area.

Pattern spray heads screw onto the end of a riser pipe. Most commonly, these sprinkler heads include a separate top section wherein the spray nozzle is located, that easily unscrews to allow maintenance of the spray head or with some designs, rotates to allow adjustment of the spray pattern. The ease in which a sprinkler head can unscrew from a riser or in which their top sections can turn is wherein the potential for a misdirected spray pattern exists. The direction of the spray pattern can change due to inadvertent manipulation and/or the start/stop cycles of water pressure resulting in misdirected spray which fires outside or rearwards of the intended 90° or 180° coverage area. Moreover, dirt, sand, water deposits or other debris can become trapped in the nozzle of the sprinkler head also resulting in erratic, misdirected spray.

Various spray shields and deflectors have been developed in an effort to confine and/or redirect irrigation spray to an intended area. Prior designs have not however, been tailored for use with pattern spray heads and/or taller risers. A device that would overcome the deficiencies associated with these commonly used components would prove useful in any irrigation system.

The following United States patents have been located which illustrate generally the state of the prior art pertaining to irrigation spray deflection or shielding. Subsequent to a professional patent search that was conducted, these are the patents or publications relevant to the prior art of which I am aware:

| U.S. Pat. No. | Patentee | Date of Patent |
|---|---|---|
| 2,639,191 | Hruby Jr. | May 19, 1953 |
| 3,009,652 | McKay | Nov. 21, 1961 |
| 4,461,423 | Davis | Jul. 24, 1984 |
| D312,296 | Smallwood | Nov. 20, 1990 |
| 5,039,015 | De La Vega Jr. | Aug. 13, 1991 |
| D418,577 | Davis | Jan. 4, 2000 |
| 6,336,599 | Herr | Jan. 8, 2002 |

The devices described in patents granted to McKay ('652), Davis ('423), Smallwood ('296), Davis ('577) and Herr ('599) can prove impractical or ineffective when used in conjunction with pattern spray heads and/or above ground risers which in modern, non-commercial irrigation systems are components most commonly utilized in confined areas of shrubbery, ground cover or flowers that are adjacent to buildings or structures.

Though the prior art of McKay ('652) and Davis ('423) could be adapted for use with any style of sprinkler head, they were originally designed to deflect spray from ratchet style impact heads in commercial or agricultural environments. This type of spray head is used mainly to irrigate large expanses of field, turf, or hillside. It is extremely uncommon for this style of spray head to be used in planted areas that are confined or that are adjacent to structures or walkways in business or residential environments.

Furthermore, the McKay ('652) and Davis ('423) patents utilize rectangular or arc-shaped plates affixed to elongated support rods and are attached to a riser by means of a collar/setscrew arrangement or a hook style clamp. These devices were designed to withstand the more powerful water pressures associated with commercial or agricultural irrigation. Attaching these devices to risers could prove impractical or difficult for non-professionals or those without adequate strength or the tools necessary to attach the devices securely to a riser. Moreover, the size and complexity of these devices could render them overly conspicuous in a formal garden, especially with closely spaced, multiple unit installations.

Spray deflecting devices designed to be inserted in the ground such as those from Smallwood ('296) and Herr ('599) could prove impractical to install and ineffective in a variety of likely situations encountered in the landscape. Installing a device deep enough in the ground to effectively position it with a riser could be a very difficult prospect, especially in hard or root bound soils. This problem is especially apparent with riser lengths of 12 to 24 inches, which are commonly used in areas of shrubbery or ground cover.

Also, for the Smallwood ('296) and Herr ('599) devices to be effective they must remain in proper alignment with a corresponding riser/spray head. It is not uncommon for taller risers to tilt out of plumb or otherwise be moved into oblique position thereby limiting the effectiveness of a spray shield that is not attached directly to them. By virtue of their height, taller risers are more prone to tilting due to the effects of water pressure, soil movement, foliage or root growth etc.

Moreover, for any ground installed device to remain properly oriented with a taller riser it must be secured deeply in the ground or it too could move from an intended position, especially in loose, amended soils common to flower beds. Should any movement occur, such a device would lose its ability to fully capture misdirected spray because this method of installation does not allow it to move in unison with a corresponding sprinkler head. Unless these prior designs are in some way fastened directly to a riser, it is likely they will require an inordinate degree of readjustment in order for them to retain an effective, spray deflecting position.

Another issue of primary importance is that a spray shield be able to prevent spray from emanating rearwards of the intended area. Should for any reason a spray pattern become erratic or misdirected and spray is directed squarely onto the sides or body of a shield there is the possibility, and indeed the likelihood that a back splash situation will occur. A shield must partially encompass the top of a spray head in order for it to effectively capture and contain an erratic or misdirected spray thus preventing it from being deflected up and rearwards to sensitive areas.

The prior art of McKay ('652), Davis ('423), Davis ('577) and Herr ('599) could prove ineffective since none include the means to contain an upwardly deflected spray. These designs utilize rectangular plates or arc-shaped shields as spray deflectors. While these designs may limit a spray pattern, they will not serve to confine upwardly misdirected spray to one side of the shield thus completely protecting water sensitive structures from back splash.

Durability and corrosion resistance are important factors in the design of any irrigation related device due to the environment in which these components are utilized. Prior designs would prove ineffective without the structural rigidity required to retain proper attitude and alignment with a riser or without the corrosion resistance necessary to ward off the effects of sustained moisture. Though the appropriate plastics would be the most suitable, cost-effective material to manufacture components for use in moisture prone environments, the durability and effectiveness of key components included in prior designs would suffer if not made of metal.

The rigidity of the post/support rods utilized to install the designs of McKay ('652), Davis ('423), Smallwood ('296) and Davis ('577) would be diminished if not made of metal. Also, the stake used to install the design of Herr ('599) would likely not prove strong enough to drive that device into hard earth unless made of, or reinforced with metal.

Corrosion is a considerable factor in designs wherein arrangements of setscrews and clamps are used to install and align the devices such as those of McKay ('652) and Davis ('577). With modern fabrication methods, these components could be manufactured from plastics, though it would be necessary to utilize metal in the fabrication of these parts to insure adequate strength and long-term functionality.

Unless relatively costly non-corrosive or coated metals are used in the manufacture of the aforementioned designs, corrosion or inadequate structural integrity could render these devices unserviceable and/or nonfunctional.

Prior inventions have utilized large plates as spray deflectors while incorporating posts or support rod/clamp assemblies as a means of orienting these deflectors with a riser. Still another uses adjustable baffles attached to a stake to achieve a similar objective. Due to their size and complexity, these devices can be cumbersome and overly conspicuous in garden environments wherein taller risers, and/or closely spaced, multiple riser configurations are common.

Thus, the devices disclosed in the McKay ('652), Davis ('423), Smallwood ('296), Davis ('577) and Herr ('599) patents serve to generally shield against unwanted spray from a sprinkler head and do indeed achieve positive results in certain scenarios. However, their inherent structural designs function to limit the practicality and the effectiveness of these units thereby limiting their utility in some of the most common garden applications.

BACKROUND—OBJECTS AND ADVANTAGES

Accordingly, several objects and advantages of my invention are:

(a) to provide a spray shield that is compatible with pattern spray heads which are commonly used in confined areas adjacent to buildings or structures, especially in residential environments;

(b) to provide a spray shield that requires no tools and a minimal degree of strength or effort to install or detach;

(c) to provide a spray shield that is compatible with risers of any height;

(d) to provide a spray shield that connects directly to a riser and that will retain an effective orientation with a riser/spray head without the need of constant readjustment;

(e) to provide a spray shield that partially encompasses the top of a spray head, enabling it to effectively capture and contain erratic or upwardly misdirected spray;

(f) to provide a spray shield that is simple, monolithic in design and without the need for assembly;

(g) to provide a spray shield that can be easily and cost effectively manufactured from injection molded plastic;

(h) to provide a spray shield that is highly durable and impervious to the effects of moisture;

(i) to provide a spray shield that is reasonably compact and inconspicuous in appearance.

Still further objects and advantages will become apparent from a consideration of the ensuing description and drawings.

SUMMARY OF THE INVENTION

In accordance with the present invention, a spray shield apparatus that attaches to an irrigation riser pipe via a circular cutout, or snap-in attaching hole integrated within the bottom end of the apparatus. Furthermore, a spray shield that will effectively contain or otherwise inhibit spray from pattern type sprinkler heads from emanating outside the desired coverage area thus helping to protect moisture sensitive areas or structures from exposure to irrigation water.

DRAWINGS—FIGURES

The following drawings portray the preferred embodiment of the invention wherein.

Figure 8A:
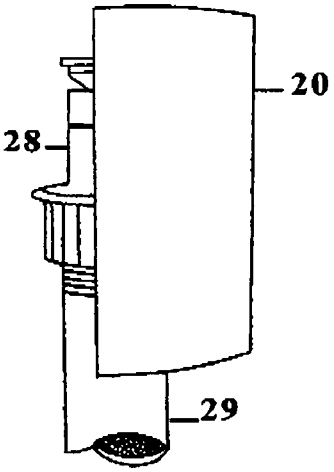

FIG. 8*a* shows a side view of an installed spray shield.

Figure 8B:
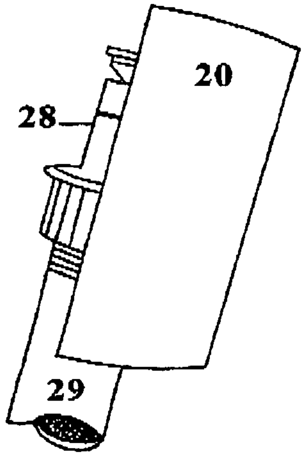

FIG. 8*b* shows a side view of an installed spray shield and highlights its ability to move in unison with a tilted riser/sprinkler head assembly.

Figure 9:
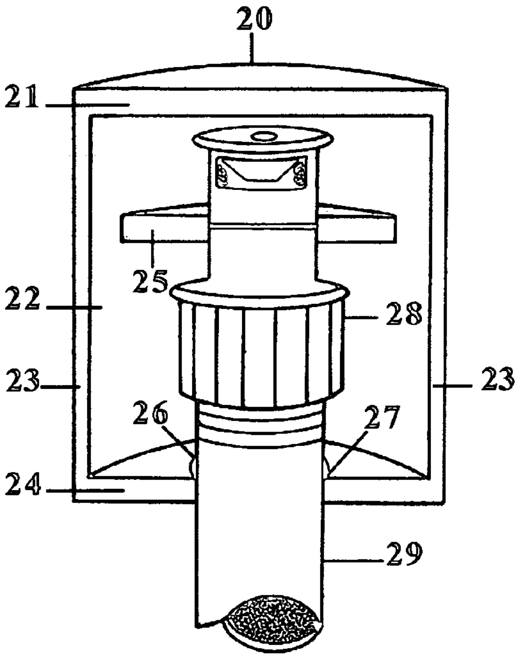

FIG. 9 shows a front view of an installed spray shield apparatus.

Figure 10:
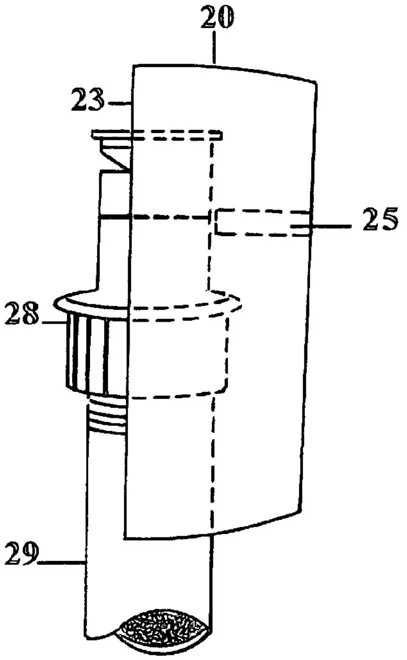

FIG. 10 highlights the aspects of the orienting shelf.

Figure 11:
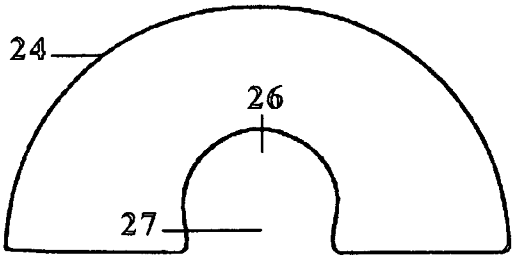

FIG. 11 shows a top orthogonal view of the bottom end of the spray shield apparatus.

Figure 12:
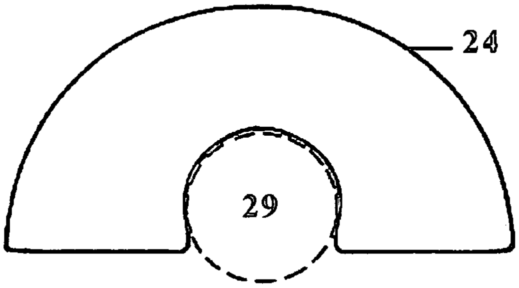

FIG. 12 shows a top orthogonal view of the bottom end of the spray shield apparatus and highlights the aspects of the gripping aperture.

| DRAWINGS - Reference Numerals | |
|---|---|
| 20 | spray shield |
| 21 | top end |
| 22 | body |
| 23 | leading vertical edges |
| 24 | bottom end |
| 25 | orienting shelf |
| 26 | snap-in attaching hole |
| 27 | gripping aperture |
| 28 | sprinkler head |
| 29 | riser |

DETAILED DESCRIPTION—PREFERRED EMBODIMENT

The present invention, generally labeled spray shield 20, comprises a spray containment device designed for use in conjunction with pattern type sprinkler heads, which are connected atop standpipes, or risers. These components are commonly utilized within modern irrigation systems to irrigate ornamental gardens adjacent to walkways, buildings or other structures in commercial and residential environments. In its preferred embodiment, my spray shield 20 is best suited for use in conjunction with semi-circle (180°) pattern sprinkler heads though it also will serve to provide an effective, albeit limited spray boundary when used with quarter circle (90°) sprinkler heads.

Figure 1:
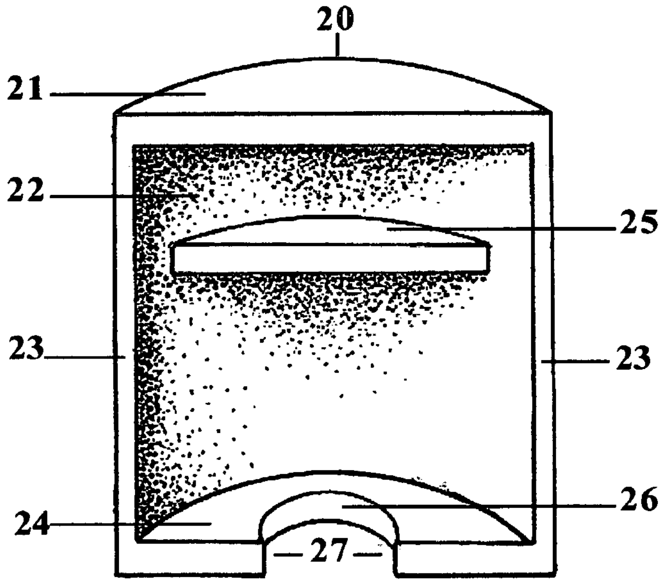
FIG. 1 shows a front perspective view of the spray shield apparatus.
Figure 2:
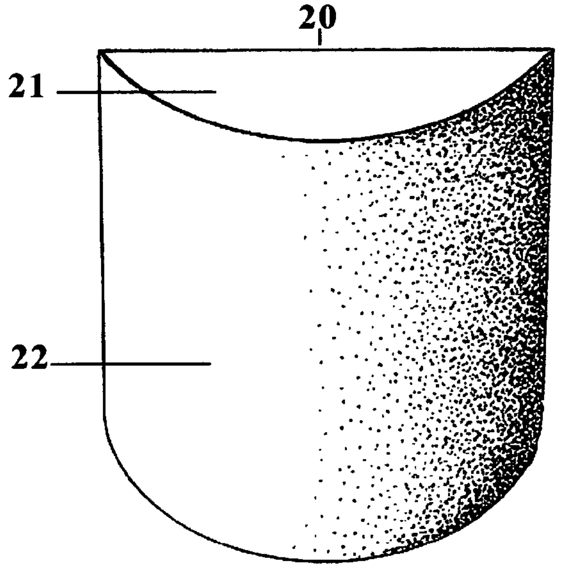
FIG. 2 shows rear perspective view of the spray shield apparatus.
Figure 3:
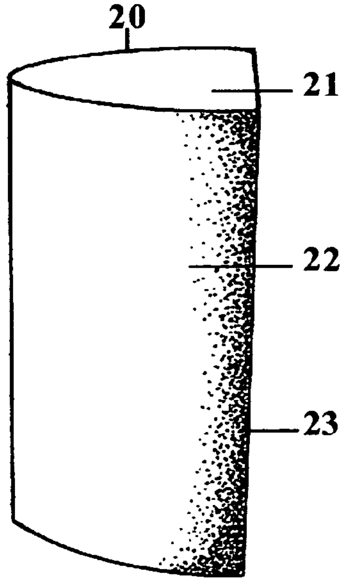
FIG. 3 shows side perspective view of the spray shield apparatus.

FIGS. 1–3 show perspective views of the preferred embodiment of my spray shield apparatus. Semi-cylindrical in design, the spray shield 20 comprises an arc-shaped body 22 enclosed with a circular segmental top end 21 and a circular segmental bottom end 24 that will capture and deflect misdirected spray from pattern type sprinkler heads or otherwise limit spray to an intended area. Its purpose is to help protect moisture sensitive areas or structures from exposure to irrigation water.

The spray shield 20 installs onto riser 29 via a snap-in attaching hole 26 integrated within the bottom end 24 of the apparatus. By virtue of this unique snap-in attachment method, my spray shield requires no tools and a minimal degree of strength or effort to install or remove. Also, this method of installation allows my spray shield to be compatible with risers of any height. The spray shield 20 includes an orienting shelf 25 on the upper interior portion of the body 22 that aids in keeping the shield vertically aligned with a riser 29/sprinkler head 28 assembly.

Figure 4:
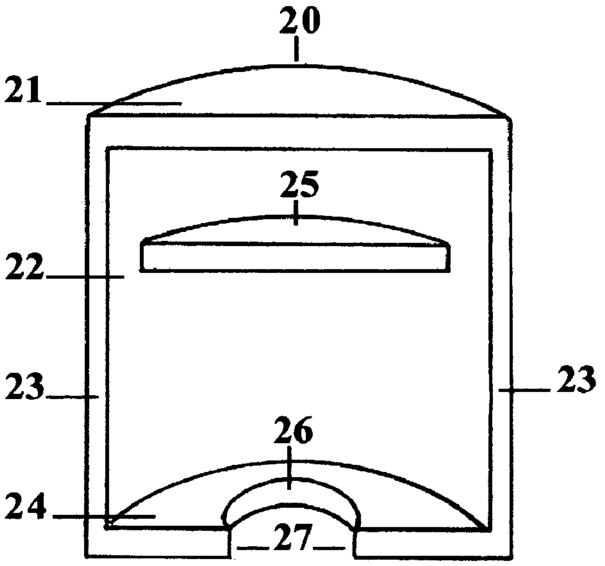
FIG. 4 shows a front perspective view of the spray shield apparatus.
Figure 5:
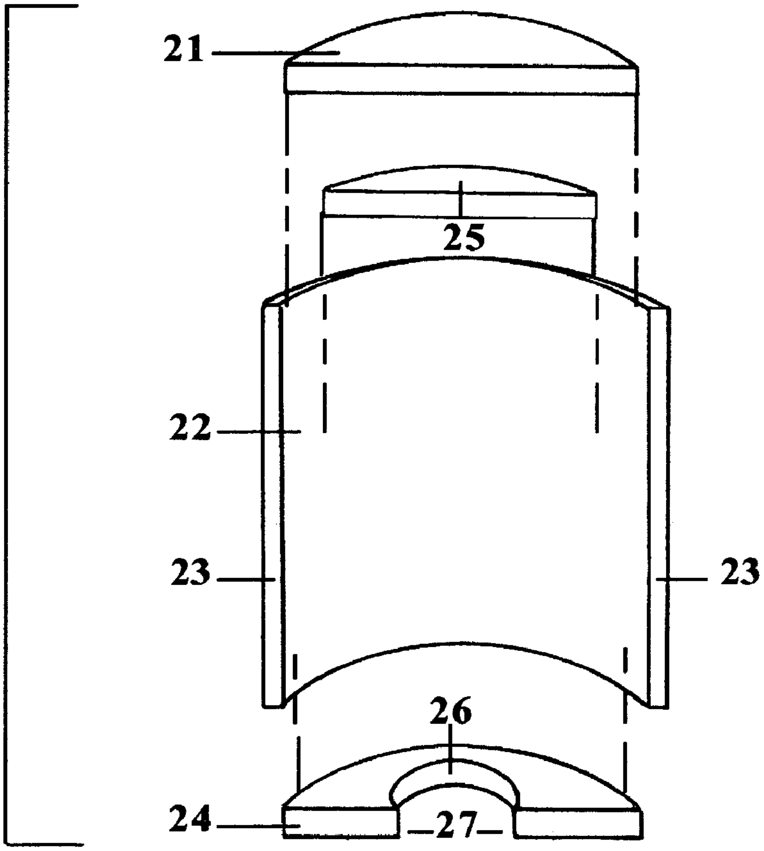
FIG. 5 shows an exploded view of the spray shield apparatus.

Though my spray shield device was conceived, as being monolithic in design with no assembly required as shown in FIG. 4, it was originally constructed in modular form as illustrated in FIG. 5. It is anticipated that this device will be fabricated from a suitable plastic such as polyethylene or ABS via the injection molding process. This manufacturing method will ensure accuracy and consistency with respect to dimensions and configurations while providing a one piece design made from material that is durable and impervious to moisture.

FIG. 5 highlights the configuration of the various sections included within the design of my device:

The 180° arc shape of the body 22 is better suited to capture a misdirected spray and deflect it back towards the center of the target area versus one of planar configuration. This design also allows my spray shield to be made smaller and more compact thereby less conspicuous in appearance.

The top end 21 of the spray shield 20 partially encompasses the top of a sprinkler head 28 thus enabling my device to effectively capture and contain an erratic or upwardly directed spray.

An orienting shelf 25 serves the function of preventing the leading vertical edges 23 of the body 22 from being nudged forward and interfering with a spray pattern.

The bottom end 24 of the spray shield 20 includes a circular cutout or snap-in attaching hole 26 that is molded in such a configuration as to incorporate a gripping aperture 27 that provides a friction fit means in which my device attaches and remains firmly affixed to a riser 29.

Figure 6:
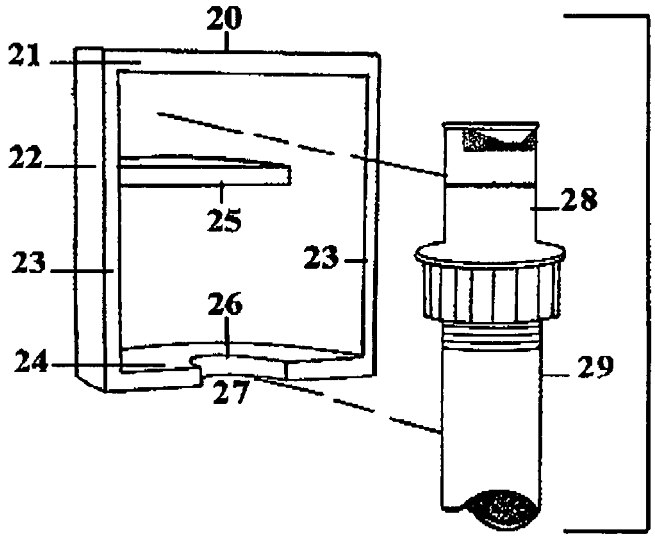
FIG. 6 shows an exploded view of the spray shield apparatus in pre-installation position relative to a riser/sprinkler head assembly.
Figure 7:
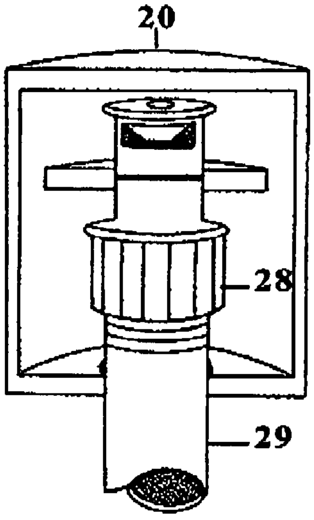
FIG. 7 shows a front view of the spray shield apparatus installed onto a riser/sprinkler head assembly.

FIGS. 6 and 7 illustrate the manner in which spray shield 20 attaches to and is situated onto a riser 29/sprinkler head 28 assembly. The spray shield 20 engages a riser 29 without the need of stakes, support rods or any configuration of clamping devices to maintain proper orientation with a riser 29/sprinkler head 28 assembly. Should for any reason a riser become tilted, the spray shield will retain its effectiveness because it will move in unison with a riser as depicted in FIGS. 8*a* and 8*b*.

One installs the spray shield 20 by visually aligning the device to the desired position relative to a spray head 28. Next, one holds the spray shield 20 so that the plane of its bottom end 24 is generally perpendicular to the axis of a riser 29 and so that the gripping aperture 27 is adjacent to the riser. Then, one presses the spray shield 20 onto the riser 29, forcing the riser through the gripping aperture 27 and into the snap-in attaching hole 26. At this point, one can slightly rotate the spray shield 20 and/or the sprinkler head 28 to achieve an optimal spray deflecting position. To remove the spray shield 20, one simply pushes or pulls the top end 21 of the device down and away from the riser 29, forcing the riser through and past the gripping aperture 27.

FIG. 9 illustrates an installed spray shield 20 and the aspects of the device relative to a riser 29/sprinkler head 28 assembly while FIG. 10 highlights the function of the orienting shelf 25. Circular segmental in shape, this feature protrudes from the upper interior portion of the body 22 and is aligned with a sprinkler head 28 when the spray shield 20 is installed. Though the spray shield 20 firmly affixes to a riser 29, with force it could be nudged forward enough to cause the leading vertical edges 23 of the body 22 to contact and interfere with a spray pattern. If the spray shield 20 is nudged forward, the orienting shelf 25 will contact the sprinkler head 28 thus halting movement of the spray shield into a spray pattern.

FIG. 11 highlights the configuration of the snap-in attaching hole 26 integrated into the bottom end 24 of the spray shield 20. This unique feature serves as the means in which my device is installed onto a riser 29. A lead-in channel or gripping aperture 27 forms the basis of the snap-in attaching hole 26. The gripping aperture 27 is narrower in width than the diameter of a riser 29 while the snap-in attaching hole 26 itself is of like diameter to a riser. While a riser 29 is situated in the snap-in attaching hole 26 as shown in FIG. 12, the gripping aperture 27 maintains lateral pressure on the riser 29 thus keeping the spray shield 20 in position.

Advantages

From its inception, my spray shield was designed to provide users with a simple, durable, cost-effective and inconspicuous means of deflecting irrigation spray away from water sensitive surfaces. From the descriptions and illustrations above, a number of advantages of my sprinkler spray shield become evident:

My spray shield will be fabricated from durable plastic via the injection molding process. This will create a one piece, no-assembly-required apparatus that will retain its structural integrity and functionality over time by being impervious to moisture.

Its semi-cylindrical body 22 serves to deflect spray towards the center of the spray pattern and more directly away from sensitive areas while the top end 21 enhances the shields ability to fully capture an erratic or upwardly misdirected spray.

This design also provides an apparatus that is relatively small and compact in nature and inconspicuous in appearance. Made from injection-molded plastic, my apparatus can be manufactured in a suitable green color that would blend with a surrounding landscape thus further enhancing its inconspicuous appearance.

The snap-in attaching hole 26 configured into the bottom end 24 of my spray shield 20 provides a uniquely simple, quick and easy means of installing the device, especially for those without a suitable degree of physical or mechanical ability or the access to tools. It is a spray shield that for example, an elderly or single person could install his or herself without expending an inordinate amount of time and effort, or having to enlist the help of others. The virtues of this attachment method become especially apparent when a person is dealing with multiple riser systems running the full length of a building or structure.

My design does not require any post, stake or support rod apparatus that extends below the shield and which needs to be anchored in the ground or to the riser itself, nor is it necessary to affix the shield to a riser with tape or tie straps. It can quickly be installed onto risers with as little as 1 inch of ground clearance, which are used to irrigate low growing components such as flowers or grass while still being practical for use with taller risers, which are commonly used to irrigate areas of shrubbery or ground cover. The ability to easily install my spray shield onto risers of any height coupled with its inconspicuous appearance makes this device adaptable to a variety of common garden scenarios.

Moreover, this attachment method allows my spray shield to be rotated on a riser, directly into the path of a spray pattern if necessary. This would enable one to quickly or temporarily shield themselves or a certain area from irrigation spray while attending to a sprinkler head or working in the immediate vicinity, without having to cap off a sprinkler head or shut the system down.

Conclusion, Ramifications, and Scope

Pattern spray heads atop varying length risers are the most common choices for above ground irrigation of gardened areas adjacent to homes, office buildings, walls or fences, especially those landscaped with shrubbery and/or ground cover. Though effective and efficient in their utility, these systems are not foolproof.

Irrigation systems routinely go unmonitored for certain lengths of time. During these periods, professionals and non-professionals alike can frequently overlook problems that develop within these systems. Spray heads can misalign, become maladjusted or clog with debris, resulting in misdirected spray hitting sensitive areas. Risers can tilt from a desired position causing spray to fire outside an intended area. These occurrences oftentimes result in damage or staining to surfaces such as wood or stucco. If left unchecked for long periods, exposure to irrigation spray can also lead to loss of structural integrity and/or mold in the vicinity of the affected area. At the very least this can result in great expense and in some cases can result in health issues for the occupants of a dwelling.

From its inception, my spray shield was designed to provide homeowners and landscapers with an extra safeguard that would help reduce the chance of irrigation related damage.

Although the description above contains many specificities, these should not be construed as limitations on the scope of the invention, but rather as an exemplification of one preferred embodiment thereof. For example, my spray shield can be of larger dimensions to accommodate different styles of sprinkler heads; the snap-in attaching hole can be enlarged along with the gripping aperture being widened to accommodate larger diameter, commercially used risers; the configuration of the orienting shelf can be altered to correlate with a given style of spray head, etc. Thus, the scope of the invention should be determined by the appended claims and their legal equivalents, rather than by the examples given.

What is claimed is:

1. A spray shield apparatus mounted atop a vertical riser that shields against spray from a sprinkler head and is attached to said riser to deflect fluid sprayed thereon, said spray shield apparatus comprising;

(a) a semi-cylindrical body enclosed with a circular segmental top end and an opposing circular segmental bottom end, said circular segmental bottom end being configured to engage said riser via friction fit thereby maintaining said spray shield substantially around said sprinkler head whereby said semi-cylindrical body and said circular segmental top end limits a spray from said sprinkler head to a predetermined area;

(b) friction fit means for attaching said spray shield apparatus to said riser without removing said sprinkler head, integrated within said circular segmental bottom end and disposed to receive and engage said riser laterally with respect to the axis of said riser and to maintain said semi-cylindrical body in a predetermined position relative to a spray pattern from said sprinkler head;

(c) means for preventing said spray shield apparatus that is attached to said riser from being forcibly tilted into a forwardly oblique position, causing the leading vertical edges of said semi-cylindrical body to contact a radius of said spray pattern from said sprinkler head thereby interfering with said spray pattern;

whereby said spray shield apparatus effectively captures and contains a misdirected spray from said sprinkler head.

2. The spray shield apparatus as in claim 1, wherein said friction fit means of attaching said spray shield apparatus to said riser comprises:

(a) a snap-in attaching hole integrated within said circular segmental bottom end, substantially circular in shape and of a predetermined diameter to accommodate and to partially encircle said riser;

(b) a gripping aperture located midway along a leading edge of said circular segmental bottom end, adjacent to and communicating with said snap-in attaching hole, of sufficient width to allow passage of said riser into said snap-in attaching hole and of sufficient narrowness to enable said gripping aperture to maintain a frictional clamping engagement to said riser;

whereby said spray shield apparatus attaches to said riser and remains in a firmly affixed position relative to said sprinkler head.

3. A method of installing the spray shield apparatus as in claim 1 onto said riser comprising:

(a) providing said spray shield apparatus of the type comprising said semi-cylindrical body enclosed with said circular segmental top end and said circular segmental bottom end, having said gripping aperture located midway along said leading edge of said circular segmental bottom end which is adjacent to and communicates with said snap-in attaching hole integrated within said circular segmental bottom end;

(b) visually aligning said spray shield apparatus to a desired position relative to said sprinkler head;

(c) holding said spray shield apparatus so that the plane of said circular segmental bottom end of said spray shield apparatus is generally perpendicular to the axis of said riser and so that said gripping aperture is adjacent to said riser;

(d) engaging said riser within said gripping aperture then forcibly pressing said riser laterally through said gripping aperture until fully situated in said snap-in attaching hole;

whereby said spray shield apparatus attaches to said riser without said removal of said sprinkler head.

4. The spray shield apparatus as in claim 1, whereby said means for preventing said spray shield apparatus that is attached to said riser from being forcibly tilted into said forwardly oblique position causing said leading vertical edges of said semi-cylindrical body to contact and interfere with said radius of said spray pattern comprises:

(a) a circular segmental shaped orienting shelf protruding from the upper interior portion of said semi-cylindrical body wherein the leading edge of said orienting shelf is disposed to contact said sprinkler head thereby preventing said forward tilt of said spray shield apparatus and maintaining a distance between said spray shield apparatus and said radius of said spray pattern.

5. The spray shield apparatus as in claim 1, wherein said spray shield apparatus is monolithic in form, containing no separate or moving parts and is composed entirely of polyethylene plastic;

whereby said spray shield apparatus is impervious to moisture related corrosion.

* * * * *